United States Patent [19]

Haas et al.

[11] 4,032,980
[45] June 28, 1977

[54] RECORDED MAGNETIC MEMBER VIEWING APPARATUS

[75] Inventors: Werner E. L. Haas, Webster; Gary A. Dir, Fairport, both of N.Y.

[73] Assignee: Xerox Corporation, Stamford, Conn.

[22] Filed: July 2, 1976

[21] Appl. No.: 702,269

[52] U.S. Cl. .................................... 360/56; 35/66; 324/38; 350/267; 353/120; 353/122; 353/78
[51] Int. Cl.² .................. G11B 5/02; G05D 25/00; G03B 21/00
[58] Field of Search ............ 350/267; 360/137, 56; 353/120, 122, 77, 78; 324/38; 35/66; 346/153

[56] References Cited
UNITED STATES PATENTS

| | | | |
|---|---|---|---|
| 3,013,206 | 12/1961 | Youngquist et al. | 324/38 |
| 3,051,041 | 8/1962 | Lehmann et al. | 353/122 |
| 3,322,482 | 5/1967 | Harmon | 350/267 |
| 3,347,614 | 10/1967 | Fuller et al. | 350/162 R |
| 3,612,657 | 10/1971 | Sawyer | 350/267 |
| 3,804,511 | 4/1974 | Rait et al. | 346/153 |
| 3,845,499 | 10/1974 | Ballinger | 360/56 |

*Primary Examiner*—Steven L. Stephan
*Attorney, Agent, or Firm*—James J. Ralabate; Richard A. Tomlin; George J. Cannon

[57] ABSTRACT

Apparatus for viewing latent magnetic images on recorded magnetizable recording members. The apparatus comprises means for advancing a magnetizable recording member bearing a latent magnetic image into a detection station at which a magneto-optic cell provides a visible display of the latent magnetic image. Optionally, a projection system directs light in reflection from the visible display to a back lighted projection screen.

11 Claims, 4 Drawing Figures

RECORDED MAGNETIC MEMBER VIEWING APPARATUS

BACKGROUND OF THE INVENTION

This invention relates to viewing latent magnetic images; and, more particularly, to apparatus for viewing latent magnetic images.

Microfilm viewing apparatus have long been utilized in the storage and retrieval of information as a compact, convenient alternative to the storage of papers commonly referred to as "hard copy".

There has recently been introduced a magnetic imaging system which employs a latent magnetic image on a magnetizable recording medium which can then be utilized for purposes such as electronic transmission or in a duplicating process by repetitive toning or transfer of the developed image. Such latent magnetic image is provided by any suitable magnetization procedure whereby a magnetized layer of marking material is magnetized and such magnetism transferred imagewise to the magnetic substrate. Such a process is more fully described in U.S. Pat. No. 3,804,511 to Rate et al.

The latent magnetic image, by way of analogy to xerographic imaging, is usually developed with a magnetic developer to render the latent magnetic image visible. The developed, visible, magnetic image is then typically transferred to a receiver such as, for example, a sheet of paper to produce a final copy or print. This final copy or print is typically referred to as hard copy.

In addition to making hard copy, there is also interest in novel compositions and techniques useful for rendering latent magnetic images visible. For example, U.S. Pat. No. 3,013,206 to Youngquist et al. discloses a magnetic reader comprising a hollow non-ferromagnetic vessel having a cavity field with a suspension of flat, visible, weakly ferromagnetic crystals which orient when suspended in the liquid and in response to a magnetic field.

It is desirable at times to store information as latent magnetic images which can be reviewed in visible form to retrieve information visually and/or select appropriate information for development into hard copy.

SUMMARY OF THE INVENTION

It is, therefore, an object of this invention to provide a novel viewer for reviewing latently imaged magnetizable recording members.

It is a further object of this invention to provide novel viewing apparatus which renders latent magnetic images clearly visible.

The foregoing objects and others are accomplished in accordance with this invention by forming a magneto-optic cell comprising a composition comprising a ferrofluid and metal flakes and placing the cell at a detection station into which a recorded magnetic member is advanced. The composition can be readily fabricated by adding metal flakes such as, for example, aluminum flakes, to a ferrofluid which can be either water based or hydrocarbon based. The metal flakes are aligned within the cell along the latent image magnetic field and reflecting more light when aligned than when non-aligned. Good contrast between aligned and non-aligned regions of the composition is provided.

DETAILED DESCRIPTION OF THE PREFERRED EMBODIMENTS

Figure 1:
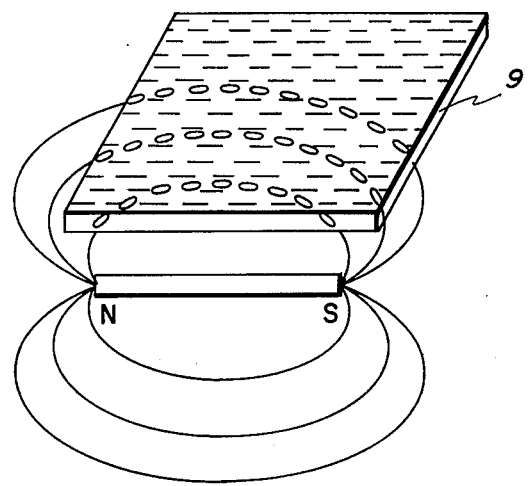
FIG. 1 is a schematic illustration of the magneto-optic effect provided by the magneto-optic cell employed in the apparatus of the present invention.
Figure 2:
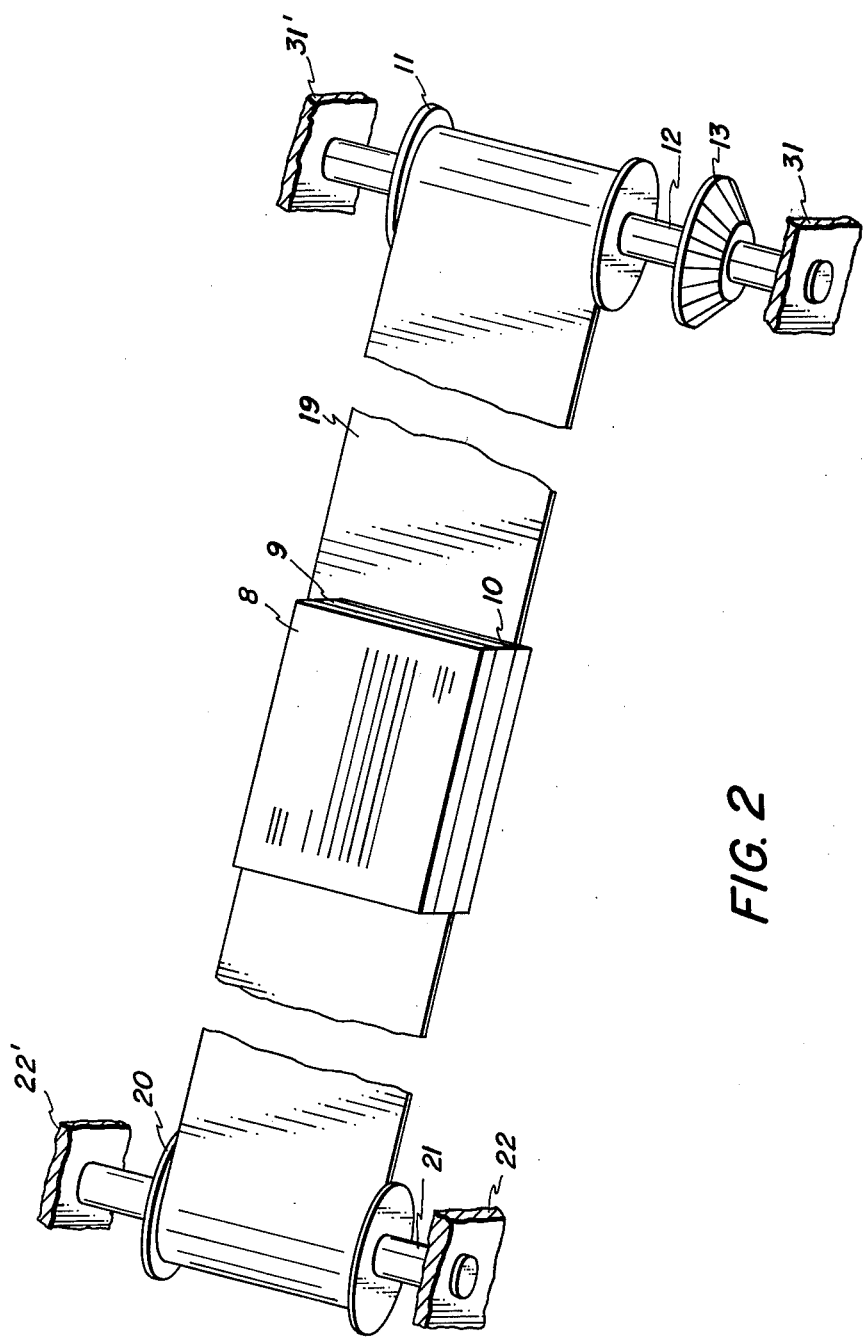
FIG. 2 is a schematic illustration of the relative positioning of the magneto-optic cell and the recorded magtizable recording member within the apparatus of the present invention.

Referring now to FIGS. 1 and 2, there is schematically illustrated the magneto-optic cell utilized in the apparatus of the present invention. The magneto-optic cell comprises composition 9 comprising a ferrofluid cell and metal flakes sandwiched between two substrates 8 and 10, at least one of said substrates being transparent to provide optical access to composition 9. The magneto-optic effect provided by composition 9 is seen in FIG. 1. For purposes of illustration only, a bar magnet having north and south magnetic poles is illustrated as being adjacent to a layer of composition 9. The elongated circles represent metal flakes in composition 9. When composition 9 is subjected to a magnetic field, the metal flakes in the subjected regions of composition 9 align with the direction of the magnetic field. In regions of composition 9 which are not subjected to a magnetic field, the metal flakes are randomly oriented and present their edges or ends to a viewer. The edges and ends of the metal flakes in composition 9 do not reflect as much light as the broad surface areas of the metal flakes and, accordingly, excellent contrast is provided between aligned and non-aligned metal flakes in composition 9.

Figure 3:
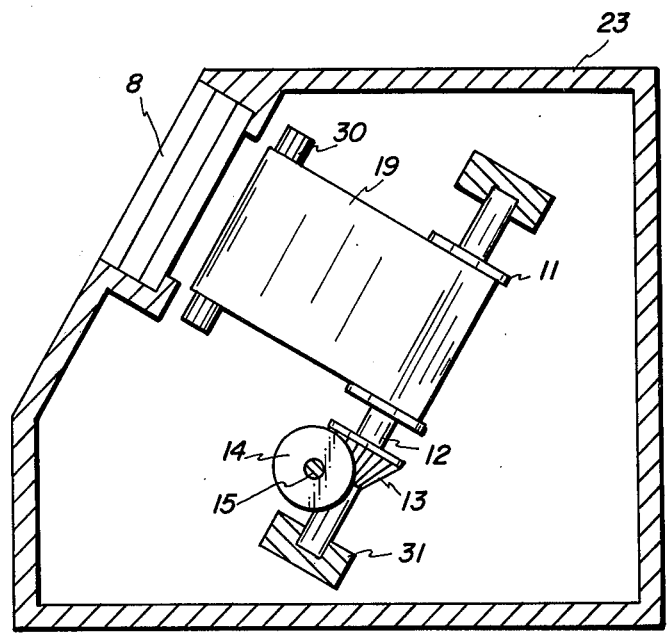
FIG. 3 is a schematic illustration of one embodiment of the present invention in which the display provided by the magneto-optic cell is viewed directly.

Turning now to FIG. 3 in conjunction with FIG. 2, there is seen in FIG. 3 a viewer housing 23 having an opening in which is mounted the magneto-optic cell with transparent substrate 8 mounted flush with the outer periphery of housing 23. Magnetizable recording member 19 is depicted as being in tape form, prewound about reel 20 having a fixed shaft 21 rotatably mounted in mounts 22 and 22'. Tapes reel 20 is freely rotatable and driven by the rotation of tapes reel 11 having a fixed shaft 12 rotatably mounted in mounts 31 and 31'. Shaft 12 of reel 11 is provided with bevel gear 13 located between reel 11 and mount 31. Bevel gear 13 is engaged with bevel gear 14 which, in turn, is driven by shaft 15. Shaft 15 is fixedly attached to bevel gear 14.

In operation, the rotation of shaft 15 rotates bevel gear 14 which rotates bevel gear 13 and thus shaft 12 and reel 11. This arrangement unwinds magnetizable recording member 19 from reel 20 onto reel 11, causing a left to right translation of magnetizable recording member 19 in FIG. 2. Although not shown, it will be appreciated that shaft 21 of reel 20 can also be provided for the bevel gear arrangement to provide translation of magnetizable recording member 19 from right to left in FIG. 2. A pair of space depart rollers 30, one along each side of the magneto-optic cell establishes a travel path for magnetizable recording member 19 which is substantially spaced apart and parallel to the magneto-optic cell. The spacing of rollers 30 from the magneto-optic cell can be fixed or adjustable, the important criteria being the proximity of magnetizable member 19 to the composition 9 effective to subject composition 9 to the magnetic field of latent magnetic images borne by recorded magnetizable recording member 19.

In FIGS. 2 and 3, reels 20 and 11 and their associated shafts and gears constitute means for advancing a magnetizable member bearing a latent magnetic image; the space between rollers 30 and the magneto-optic cell constituting a detection station.

Figure 4:
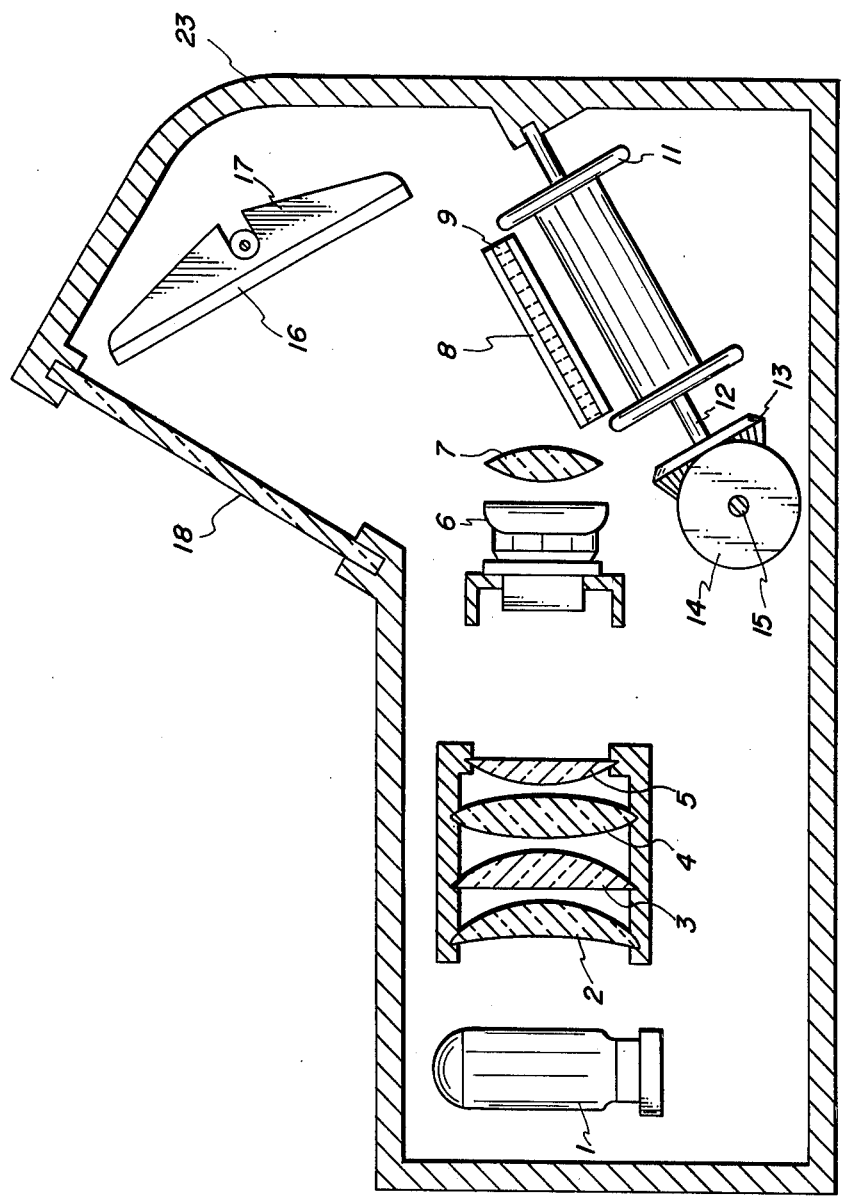
FIG. 4 is another embodiment of the present invention wherein the magneto-optic cell display is projected onto a projection screen.

In another embodiment of the apparatus of the present invention, shown in FIG. 4, the magneto-optic cell and detection station is located well within housing 23 and is combined with a projection screen and means for projecting light in reflection from the metal flakes in composition 9 upon the projection screen. Lamp 1, lenses 2, 3, 4, 5, 6, 7 and mirror 16 constitute means for projecting light in reflection from the metal flakes in composition 9 upon projection screen 18. The detection station in FIG. 4 is located within the optical pathway of the projection means.

In operation, light from lamp 1 passes through a condensor lens assembly comprising lenses 2, 3, 4, and 5, enters projection lens assembly 6, is projected through lens 7 and strikes the magneto-optic cell. Light is reflected from metal flakes aligned in imagewise configuration corresponding to the latent magnetic image, strikes mirror 16 and is reflected therefrom upon frosted glass screen 18. A shield may be provided around screen 18 to prevent ambient light from interfering with the projected image.

It will be appreciated, of course, that the means for advancing a magnetizable member bearing a latent magnetic image into the detection station of FIGS. 3 and 4 can be connected to a conventional power source such as, for example, an electrical motor rotatably connected to double gear 14. For example, shaft 15 could be the drive shaft of an electric motor or, if manual operation were desired, could be extended through housing 23 and connected to a crank handle. Of course, bevel gears provided on shaft 21 of reel 20 could also be similarly driven.

DETAILED DESCRIPTION OF THE PREFERRED EMBODIMENTS

"Ferrofluids" as used herein means stable colloidal dispersions of ferri- or ferro-magnetic particles in a liquid medium. The liquid medium can be either water or a hydrocarbon liquid medium. The ferri- or ferromagnetic particles do not flocculate or settle out under the influence of either gravatational or magnetic fields. Ferrofluids behave much like their liquid vehicle in the absence of a magnetic field; however, when a field is applied, the colloidal particles carry their surfactant coating in a substantial solvation sheath along the field gradient. Typically, the surfactant employed is a long-chain organic acid such as oleic acid, linoleic acid; succinic acid derivatives; ECA 3852 manufactured by Exxon Corporation. The particles are less than a critical size to be colloidally stable and in order that the energy of domain wall formation be greater than the energy for rotation of all the spins in the particle.

For a description of ferrofluids, see "Magnetic Fluids" by S. E. Khalafalla in *Chem. Tech.*, page 540, September, 1975; and "Some Applications of Ferrofluid Magnetic Colloids", by Kaiser and Miskolczy *IEEE Transactions on Magnetics*, page 694, volume MAG-6, No. 3, September, 1970.

Generally speaking, magnetic material can exhibit three modes of magnetic behavior depending on particle size. Superparamagnetic behavior, one of the three modes, is exhibited by different materials at particle sizes which vary with the identity of the material. A simplified relationship which allows an approximation for determining the maximum particle diameter at which a given material will exhibit superparamagnetism is given by the equation "Critical volume = $25kT \div K$" where $k$ is Boltzmann's constant ($1.38 \times 10^{-16}$ erg/degree), T is the Kelvin temperature, and K is the magnetic anisotropy in erg/cubic centimeter. This equation is an approximation for spherical uniaxial particles of equal size. The anisotropy values for K are related to the measureable anisotropy constants $K_1$ and $K_2$ by: $K = K_1/4$ when $K_1$ is greater than 0; and $K = K_1/12 + K_2/27$ when $K_1$ is less than 0. For example, at $T = 298°$ Kelvin, the maximum diameters for superparamagnetic behavior in spherical particles of iron, cobalt, and magnetite are respectively: 250 angstroms, 120 angstroms, and 600 angstroms. For a more thorough discussion of superparamagnetism, see "Superparamagnetism" by C. P. Bean and J. D. Livingston, *J Appl Phys*, supplement to volume 30, no. 4, page 1205 (1959).

Typical suitable ferrofluids for use in accordance with the practice of the present invention may be prepared by ball-milling the magnetic particles for periods of about 1,000 hours in the presence of a surfactant as disclosed in "Magnetic Properties of Stable Dispersions of Sub-domain Magnetite Particles", *J Appl Phys*, Volume 41, page 1064, by R. Kaiser and G. Miskolczy (1970). Residual coarse material may be centrifuged or allowed to settle out in order to produce a stable ferrofluid by this mechanical milling method. Other methods of preparing ferrofluids include chemical precipitation methods. See, for example, "Preparing Magnetic Fluids by a Peptizing Method", U.S. Bureau of Mines Technical Progress Report 59, G. W. Reimers and S. E. Khalafalla, September, 1972; and U.S. Pat. No. 3,228,881 to Thomas directed to a method of preparing a dispersion of discrete particles of ferromagnetic metals.

Commercially available ferrofluids, such as, for example, ferrofluids exhibiting superparamagnetic behavior can be employed in the practice of the present invention. Such ferrofluids are commercially available for Ferrofluidics Corporation of Burlington, Massachusetts.

Once the superparamagnetic fluid has been prepared, by whatever method, or obtained commercially, metal flakes are added thereto, and, optionally, an appropriate diluent is added. By "appropriate diluent" it is meant that the diluent is compatible with the carrier liquid used in making the ferrofluid; for example, if the ferrofluid is water based, the diluent is water. Similarly, if the ferrofluid is hydrocarbon based, the diluent is a hydrocarbon liquid.

The metal flakes to be added to the ferrofluids can comprise any size flakes which will remain suspended in the ferrofluid and not settle out under conditions of use. In this regard, metal flakes of a size of about 325 mesh or smaller in size than about 325 mesh is preferred. However, larger size flakes can be employed provided they do not settle out of the ferrofluid. Metals of good reflectivity are preferred in the practice of the present invention since it is the reflection of light from the broad surface area of the flakes which provides contrast between magnetic field aligned portions of the composition and non-aligned portions of the composition. In this regard, aluminum flakes available from Aluminum Corporation of America have been found to provide excellent results when used in the practice of the present invention. However, any metal flake can be employed which provides an optical characteristic in alignment which is visibly distinguishable from that presented by the flake when viewed on edge or on end.

It has been found that metal flakes suspended in ferrofluids will become aligned in the direction of the magnetic field to which they are subjected and that, furthermore, the alignment is such that predominantly the broad surface area of the metal flake aligns parallel to the magnetic field direction to which the composition is subjected. While the mechanism which accounts for this alignment of the metal flake in a ferrofluid which is subjected to a magnetic field is unknown, it is believed that a guest-host interaction is involved. That is, it is believed that the formation of chains by the magnetic particles in the ferrofluid when subjected to a magnetic field causes the metal flakes suspended in the ferrofluid to align with the chain formation.

While preferred ranges of ferrofluid, diluent and metal flakes are presented in the examples set forth below, it will be appreciated that amounts of components outside these ranges can be employed. For example, in the examples presented below, the magnetic field was varied between 0.5 gauss and 300 gauss. The designation "too thick" and "too thin" in the examples set forth below indicate that satisfactory optical contrast was not achieved with a magnetic field between about 0.5 gauss. In the case of a designation too thick a magnetic field greater than about 300 gauss should be employed. Where the designation too thin appears, it indicates that for the relatively small planer sample tested, the amount of aluminum flakes contained in the sample did not give satisfactory optical contrast.

The following examples are set forth to give guidance to one skilled in the art as to the relative compositional values which are satisfactory for relatively low magnetic field strength imaging; i.e., magnetic field strengths between about 0.5 gauss to about 300 gauss. In all cases, unless otherwise noted, the ferrofluids were obtained from Ferrofluidics Corporation of Burlington, Massachusetts and had a magnetic saturation of about 200 gauss; the hydrocarbons liquid diluent was SOHIO Product 3440 commercially available from Standard Oil Company of Ohio; the metal flakes were aluminum flakes of a size which permits passage through a 325 mesh screen, commercially available from Alcoa and parts and percentages are by weight.

EXAMPLE I

A water based composition comprising one part (10%) water based ferrofluid; one part (10%) metal flakes; and, eight parts (80%) water is made by adding the flakes and water to the ferrofluid and stirring to achieve a resulting composition of uniform appearance. The composition is placed between an about four micron thick piece of Mylar film and a glass micorscope slide to form a magneto-optic cell. The cell is subjected to a magnetic field which is varied between about 0.5 gauss and about 300 gauss.

Prior to being subjected to the magnetic field, the cell appears dark black. Upon being subjected to the field, the metal flakes impart an aluminum appearance to portions of the cell subjected to the magnetic field.

The remaining hydrocarbon based ferrofluid examples are performed in the manner of Example I. The compositional values and results are set forth in Table I, below. *"D" means diluent, *"FF" means ferrofluid and *"MF" means metal flakes. In each example, the result is based on a magnetic field varied between about 0.5 gauss and about 300 gauss.

TABLE I

| EXAMPLE | Parts *D | Parts *FF | Parts *MF | Result |
|---|---|---|---|---|
| II | 0 | 1 (50%) | 1 (50%) | Too Thick |
| III | 10 (83%) | 1 (8 ½%) | 1 (8 ½%) | O.K. |
| IV | 20 (91%) | 1 (4 ½%) | 1 (4 ½%) | O.K. |
| V | 50 (96%) | 1 (2%) | 1 (2%) | O.K. |
| VI | 100 (98%) | 1 (1%) | 1 (1%) | Too Thin |
| VII | 0 | 1 (33%) | 2 (67%) | Too Thick |
| VIII | 20 (87%) | 1 (4 ⅓%) | 2 (8 ⅔%) | Too Thick |
| IX | 40 (93%) | 1 (2%) | 2 (5%) | O.K. |
| X | 100 (97%) | 1 (1%) | 2 (2%) | O.K. |
| XI | 200 (98.5%) | 1 (.5%) | 2 (1%) | O.K. |
| XII | 0 | 1 (20%) | 4 (80%) | Too Thick |
| XIII | 10 (67%) | 1 (6.6%) | 4 (26.4%) | Too Thick |
| XIV | 20 (80%) | 1 (4%) | 4 (16%) | Marginally O.K. |
| XV | 50 (91%) | 1 (1.8%) | 4 (7.2%) | O.K. |
| XVI | 100 (95%) | 1 (1%) | 4 (4%) | O.K. |

It is to be noted that the above results were obtained with magnetic fields applied between about 0.5 gauss and about 300 gauss. Accordingly, magnetic fields greater than about 300 gauss would have to be employed or, in the alternative compositional variations beyond Table I would have to be employed in some cased to obtain satisfactory optical results. For example, as noted in Table I that in examples II, VII, and XII, the resulting composition was too thick to provide satisfactory optical characteristics. In these examples, no diluent was added to the ferrofluid-metal flake composition and the ferrofluid was always present in an amount no greater than an equal part by weight of the metal flakes. The thickness of the resulting composition in those three examples can be altered by varying the ratio of ferrofluid to metal flakes such that the ferrofluid is always present in a greater amount by weight than the metal flakes. In this manner, suitable optical response can be obtained for magnetic fields between about 0.5 gauss and about 300 gauss. It is to be noted that as earlier defined, a ferrofluid contains a liquid carrier in which the superparamagnetic particles are colloidally suspended. Accordingly, the addition of greater amounts of ferrofluid relative to metal flakes will inherently dilute the resulting composition. As a matter of preference, the addition of diluent is preferred rather than the use of more ferrofluid simply as a matter of practical economics.

While this invention has been described with respect to particularly preferred embodiments, it will be appreciated by those skilled in the art that the invention is not limited thereto.

For example, the viewer can be appropriately modified for purposes of directing the light reflected from the metal flakes in the magneto-optic cell to a xerographic drum in accordance with the disclosure in U.S. Pat. No. 3,160,058 to Rutkus. It will be appreciated that this application of the viewing apparatus will provide a positive to negative image transformation. That is, light reflected from the metal flakes in the magneto-optic cell is in imagewise configuration conforming to the latent magnetic image and therefore is a positive image. When directed upon a xerographic imaging member such as a photoconductor, the photoconductor will be discharged in imagewise configuration and developer applied to the photoconductor will adhere to the photoconductor in background configuration. On the other hand, if the magnetizable recording member is recorded as a negative with spatial patterns of magnetic transitions in background configuration, a negative image will be formed in the magneto-optic cell and a positive image will be developed on the photoconductor.

What is claimed is:

1. Latent magnetic image viewing apparatus, comprising:
 a. means for advancing a magnetizable member bearing a latent magnetic image into a detection station; and
 b. at said detection station a magneto-optic cell comprising between two magnetic field permeable substrates, a composition comprising ferrofluid and metal flakes, at least one of said substrates being transparent and providing optical access to said composition.

2. The apparatus of claim 1 further comprising means for illuminating said composition.

3. The apparatus of claim 2 further including a projection screen and means for projecting light in reflection from said metal flakes in said composition upon said projection screen.

4. The apparatus of claim 1 wherein said composition further comprises a diluent.

5. The apparatus of claim 4 wherein said composition comprises by weight from about 80% to about 98.5% diluent, from about 0.5% to about 8.5% ferrofluid, and from about 1% to about 16% metal flakes.

6. The apparatus of claim 5 wherein said diluent comprises water and said ferrofluid comprises an aqueous carrier liquid.

7. The apparatus of claim 6 wherein said composition comprises about 10% ferrofluid and about 10% metal flakes.

8. The apparatus of claim 5 wherein said diluent comprises a hydrocarbon liquid and said ferrofluid comprises a hydrocarbon carrier liquid.

9. The apparatus of claim 8 wherein by weight said composition comprises about one part ferrofluid, about one part metal flakes, and from about 10 to about 50 parts diluent.

10. The apparatus of claim 8 wherein by weight said composition comprises about one part ferrofluid, about two parts metal flakes and from about 40 to about 200 parts diluent.

11. The apparatus of claim 8 wherein by weight said composition comprises about one part ferrofluid, about four parts metal flakes and from about 40 to about 200 parts diluent.

* * * * *